(12) United States Patent
Haruta et al.

(10) Patent No.: US 10,035,335 B2
(45) Date of Patent: Jul. 31, 2018

(54) HEAT-SHRINKABLE POLYESTER FILM AND PACKAGE

(71) Applicant: TOYOBO CO., LTD., Osaka-shi, Osaka (JP)

(72) Inventors: Masayuki Haruta, Tsuruga (JP); Shintaro Ishimaru, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 160 days.

(21) Appl. No.: 15/300,774

(22) PCT Filed: Mar. 3, 2015

(86) PCT No.: PCT/JP2015/056204

§ 371 (c)(1),
(2) Date: Sep. 29, 2016

(87) PCT Pub. No.: WO2015/151695

PCT Pub. Date: Oct. 8, 2015

(65) Prior Publication Data

US 2017/0021601 A1 Jan. 26, 2017

(30) Foreign Application Priority Data

Apr. 1, 2014 (JP) .................................. 2014-075842
Jan. 15, 2015 (JP) .................................. 2015-005593

(51) Int. Cl.
*C08J 5/18* (2006.01)
*B65D 75/00* (2006.01)
(Continued)

(52) U.S. Cl.
CPC ............ *B32B 27/36* (2013.01); *B29C 55/005* (2013.01); *B29C 55/143* (2013.01);
(Continued)

(58) Field of Classification Search
None
See application file for complete search history.

(56) References Cited

U.S. PATENT DOCUMENTS 4,059,667 A * 11/1977 Pangonis .............. B29C 55/143
264/216
4,996,291 A * 2/1991 Yoshinaka ............ B29C 61/003
264/210.7
(Continued)

FOREIGN PATENT DOCUMENTS

JP H05-033895 B2 5/1993
JP 2009-226939 A * 10/2009
(Continued)

OTHER PUBLICATIONS

Japanese Patent Office, International Search Report in Japanese Patent Application No. PCT/JP2015/056204 (dated May 26, 2015) English translation.
(Continued)

*Primary Examiner* — Vivian Chen
(74) *Attorney, Agent, or Firm* — Leydig, Voit & Mayer, Ltd.

(57) ABSTRACT

The invention provides a heat shrinkable polyester film which has (1) a hot-water heat shrinkage of not less than 55% and not more than 90% in a main shrinking direction of the film when dipped in hot water at 98° C.; (2) a hot-water heat shrinkage of not less than −5% and not more than 12% in a direction orthogonal to the main shrinking direction of the film when dipped in hot water at 98° C.; (3) a difference in specific heat capacity $\Delta C_p$ between at a lower and a higher temperature than Tg of not less than 0.1 J/(g·° C.) and not more than 0.7 J/(g·° C.) when a reverse heat flow is measured with a temperature modulated DSC; and (4) a tensile breaking strength of not less than 70 MPa and not (Continued)

more than 150 MPa in the direction orthogonal to the main shrinking direction of the film.

16 Claims, 2 Drawing Sheets

(51) Int. Cl.
  *B32B 27/36* (2006.01)
  *B29C 55/14* (2006.01)
  *B29C 55/00* (2006.01)
  *B65D 23/08* (2006.01)
  *C08G 63/183* (2006.01)
  *C08L 67/02* (2006.01)
  *B29K 67/00* (2006.01)

(52) U.S. Cl.
  CPC ....... *B65D 23/0878* (2013.01); *C08G 63/183* (2013.01); *C08J 5/18* (2013.01); *B29K 2067/00* (2013.01); *B29K 2995/0049* (2013.01); *B29K 2995/0053* (2013.01); *B32B 2307/54* (2013.01); *B32B 2307/582* (2013.01); *B32B 2307/736* (2013.01); *B32B 2309/02* (2013.01); *B32B 2309/04* (2013.01); *B32B 2439/00* (2013.01); *B65D 75/00* (2013.01); *B65D 75/002* (2013.01); *B65D 2203/02* (2013.01); *C08J 2367/02* (2013.01); *C08J 2467/02* (2013.01); *C08L 67/02* (2013.01); *Y10T 428/1328* (2015.01); *Y10T 428/31786* (2015.04)

(56) References Cited

U.S. PATENT DOCUMENTS

| | | | | |
|---|---|---|---|---|
| 7,829,655 B2* | 11/2010 | Endo | ................ | B29C 55/146 264/176.1 |
| 8,206,797 B2* | 6/2012 | Haruta | ................ | B29C 61/003 283/81 |
| 8,673,414 B2* | 3/2014 | Haruta | ................ | B29C 61/003 264/164 |
| 8,685,305 B2* | 4/2014 | Haruta | ................ | B29C 55/143 264/210.1 |
| 8,728,594 B2* | 5/2014 | Haruta | ................ | B29C 55/14 428/304.4 |
| 9,017,782 B2* | 4/2015 | Haruta | ................ | B29C 61/003 428/192 |
| 9,296,867 B2* | 3/2016 | Haruta | ................ | C08J 5/18 |
| 9,352,508 B2* | 5/2016 | Haruta | ................ | B29C 55/065 |
| 9,920,162 B2* | 3/2018 | Haruta | ................ | B29C 61/003 |
| 2009/0270584 A1* | 10/2009 | Endo | ................ | B29C 55/146 528/308.1 |
| 2009/0304997 A1* | 12/2009 | Haruta | ................ | B29C 61/003 428/156 |
| 2010/0247845 A1* | 9/2010 | Haruta | ................ | B29C 55/143 428/98 |
| 2010/0260951 A1* | 10/2010 | Haruta | ................ | B29C 61/003 428/35.1 |
| 2010/0331513 A1* | 12/2010 | Kim | ................ | C08J 5/18 528/272 |
| 2011/0008607 A1* | 1/2011 | Haruta | ................ | B29C 55/14 428/304.4 |
| 2012/0043248 A1* | 2/2012 | Haruta | ................ | B29C 55/065 206/497 |
| 2013/0008821 A1* | 1/2013 | Haruta | ................ | C08J 5/18 206/459.5 |
| 2013/0136906 A1* | 5/2013 | Ueyama | ................ | B32B 27/08 428/213 |
| 2014/0043248 A1 | 2/2014 | Yeh et al. | | |
| 2015/0014202 A1* | 1/2015 | Haruta | ................ | B29C 61/003 206/459.5 |
| 2015/0175756 A1* | 6/2015 | Haruta | ................ | B29C 61/003 525/444 |
| 2016/0090456 A1* | 3/2016 | Ishimaru | ................ | C08J 5/18 428/131 |
| 2016/0137833 A1* | 5/2016 | Haruta | ................ | B29C 61/003 206/459.5 |
| 2018/0079877 A1* | 3/2018 | Ishimaru | ................ | C08J 5/18 |

FOREIGN PATENT DOCUMENTS

| | | |
|---|---|---|
| JP | 2013-516338 A | 5/2013 |
| JP | 5240387 B1 | 7/2013 |
| JP | 5339061 B2 | 11/2013 |
| JP | 2014-024253 A | 2/2014 |
| WO | WO 2010/137240 A1 | 12/2010 |

OTHER PUBLICATIONS

European Patent Office, Communication Pursuant to Article 94(3) EPC in European Patent Application No. 15772193.7 (dated Feb. 27, 2018).

* cited by examiner

[Fig.1]
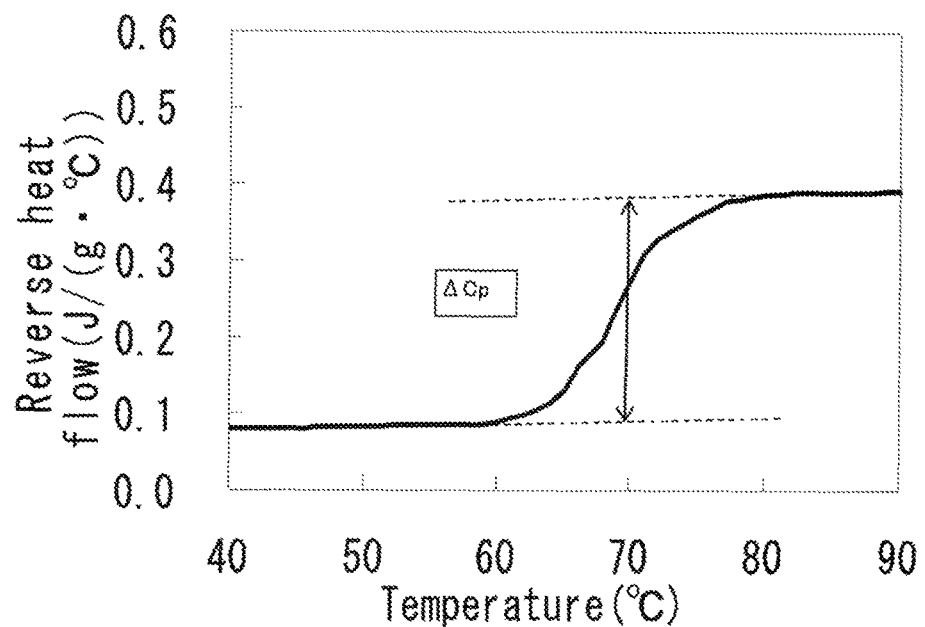
[Fig.2]
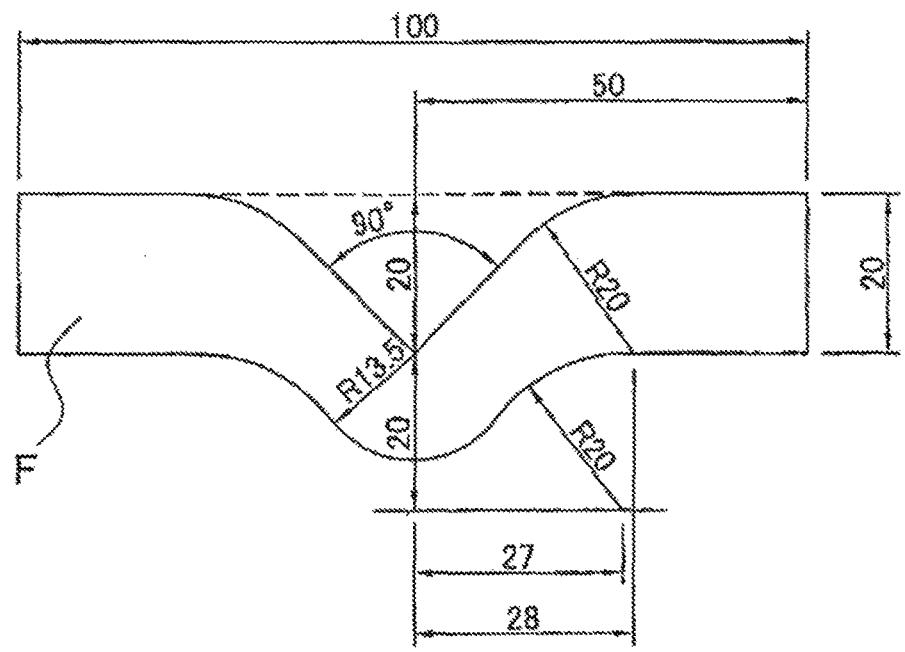

[Fig.3]
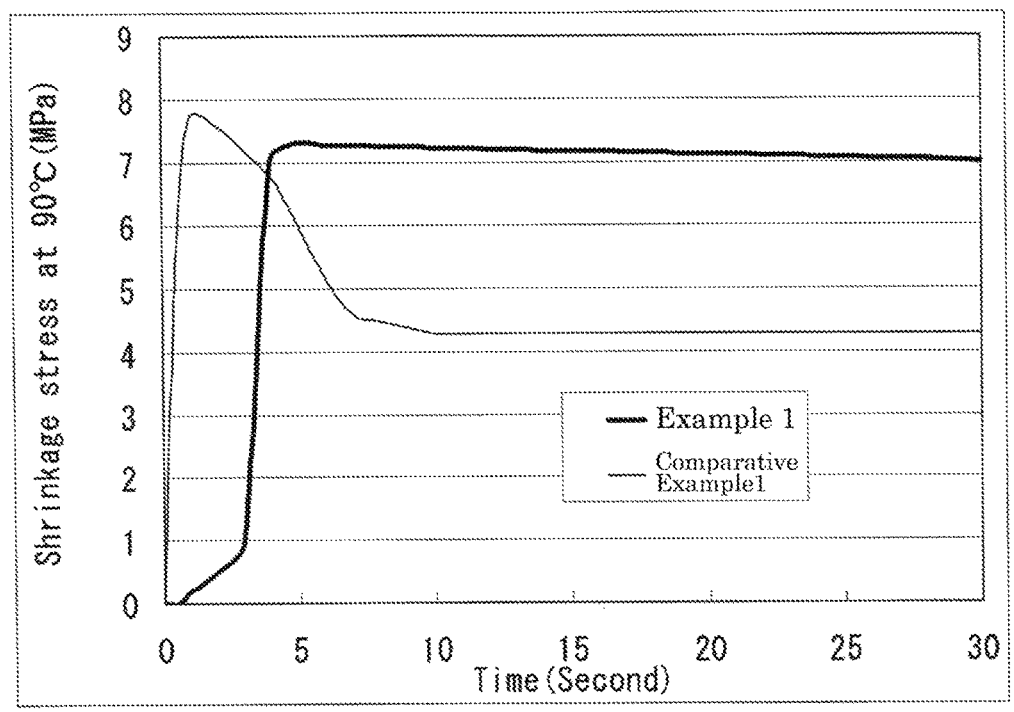

HEAT-SHRINKABLE POLYESTER FILM AND PACKAGE

CROSS-REFERENCE TO RELATED APPLICATIONS

This patent application is the U.S. national phase of International Patent Application No. PCT/JP2015/056204, filed Mar. 3, 2015, which claims the benefit of Japanese Patent Application No. 2014-075842, filed on Apr. 1, 2014, and Japanese Patent Application No. 2015-005593, filed on Jan. 15, 2015, which are incorporated by reference in their entireties herein.

TECHNICAL FIELD

The present invention relates to a heat-shrinkable polyester film which is suitable for a label application and a package using the label.

BACKGROUND ART

Recently, in applications such as label package doubling as a protection of a glass bottle and a PET bottle etc. and display of articles, cap sealing and accumulation package, there have been widely used, as a shrink label, a polyester-based heat-shrinkable film which is high in heat resistance, easy to incinerate, and excellent in solvent resistance. The use amount of the polyester-based heat-shrinkable film tends to increase being accompanied by an increase in volume of PET containers.

Heretofore, a heat-shrinkable polyester film has been widely utilized which shrinks greatly in the width direction. It is also known that the shrinkage in the longitudinal direction, which is a non-shrinking direction, is made to be below zero (so-called extend due to heating) in order to achieve satisfactory shrinkage finishing properties (Patent Document 1). Although the heat-shrinkable polyester film in which the width direction is the main shrinking direction is subjected to drawing at a high ratio in the width direction in order to exhibit the shrinkage properties in the width direction, with regard to the longitudinal direction orthogonal to the main shrinking direction, there have been many cases in which the film is only subjected to drawing at a low ratio and there is also a case in which the film is not subjected to drawing. The film subjected to drawing at a low ratio in the longitudinal direction and the film subjected to drawing only in the width direction have a drawback that the mechanical strength in the longitudinal direction is poor. Moreover, when the film is subjected to drawing in the longitudinal direction in order to improve the mechanical strength in the longitudinal direction, the mechanical strength in the longitudinal direction increases, but the shrinkage in the longitudinal direction also increases, which in turn deteriorates shrinkage finishing properties.

Conventional heat-shrinkable films have been produced by adjusting the composition of polyester and the drawing conditions so that the hot-water heat shrinkage at 90° C. is 40 to 60% (Patent Document 2). With regard to the heat-shrinkable films having even higher shrinkage, the hot-water heat shrinkage at 90° C. is 40 to 80% (Patent Document 3), and a heat-shrinkable film having a hot-water heat shrinkage at 90° C. exceeding 80% has not been produced.

In recent years, for the purpose of protection of contents or improvement in design, there is a need to cover a major portion of a container with a label. Then, high shrinkable films having a shrinkage in the width direction exceeding 80% has been desired. On the other hand, when the shrinkage in the longitudinal direction is high, the length of the label in the longitudinal direction becomes short, which is contrary to the need to cover a major portion of a container with a label. Therefore, a need to make the shrinkage in the longitudinal direction become 0 or below zero (extend) has increased. However, with regard to the films with high mechanical strength in the longitudinal direction as in Patent Documents 2 and 3, the shrinkage in the longitudinal direction is not below zero.

It is contradictory that while the mechanical strength in the longitudinal direction maintains high, the shrinkage in the longitudinal direction is reduced below zero, and this is difficult. Further, when the shrinkage in the width direction is made higher, the shrinkage in the longitudinal direction also becomes higher, so that the film becomes inferior in shrinkage finishing properties.

PRIOR ART DOCUMENT

Patent Documents

Patent Document 1: Japanese Examined Patent Application Publication No. Hei05-33895
Patent Document 2: Japanese Patent No. 5420387
Patent Document 3: Japanese Patent No. 5339061

SUMMARY OF THE INVENTION

Problems to be Solved by the Invention

The present invention aims to provide a heat-shrinkable polyester film which has high heat shrinkage in the width direction, exhibits small heat shrinkage in the longitudinal direction, and has high mechanical strength in the longitudinal direction, favorable perforation opening property, and excellent shrinkage finishing properties.

Means for Solving the Problem

The present invention to solve the above problems is a heat shrinkable polyester film which satisfies the following requirements (1) to (4).

(1) the film has a hot-water heat shrinkage of not less than 55% and not more than 90% in a main shrinking direction of the film when dipped in hot water at 98° C. for 10 seconds;

(2) the film has a hot-water heat shrinkage of not less than −5% and not more than 12% in a direction orthogonal to the main shrinking direction of the film when dipped in hot water at 98° C. for 10 seconds;

(3) the film has a difference in specific heat capacity $\Delta C_p$ between at a lower and a higher temperature than Tg of not less than 0.1 J/(g·° C.) and not more than 0.7 J/(g·° C.) when a reverse heat flow is measured with a temperature modulated DSC; and (4) the film has a tensile breaking strength of not less than 70 MPa and not more than 150 MPa in the direction orthogonal to the main shrinking direction of the film.

The difference in specific heat capacity between at a lower and a higher temperature than Tg in the requirement (3) mentioned above is equivalent to the amount of conventional amorphous (mobile amorphous; conventional full amorphous) in which molecular chains begin to move around Tg, though described later in detail. The mobile amorphous can be distinguished from rigid amorphous in which molecular chains do not move until the temperature becomes higher than Tg. The present inventors have found that the mobile amorphous amount influences heat shrinkage, and that it is important that the mobile amorphous is not converted to rigid amorphous as much as possible or most of the rigid amorphous is converted to mobile amorphous in order to obtain a film having high heat shrinkage and difficult to shrink in the longitudinal direction. The present invention has been completed based on this finding.

It is preferable that the heat-shrinkable polyester film of the present invention has a maximum shrinkage stress of not less than 2 MPa and not more than 14 MPa in the main shrinking direction of the film measured with hot air at 90° C., and a shrinkage stress of not less than 60% and not more than 100% of the maximum shrinkage stress 30 seconds after measurement start. It is preferable that the heat-shrinkable polyester film of the present invention has a right-angled tearing strength per unit thickness of not less than 180 N/mm and not more than 350 N/mm in the direction orthogonal to the main shrinking direction of the film after being shrunk by 10% in the main shrinking direction in hot water at 80° C. The heat-shrinkable polyester film of the present invention is biaxially drawn in the main shrinking direction and in the direction orthogonal to the main shrinking direction.

The present invention also contains a package formed by covering at least a part of an outer periphery of an object to be packaged with a label obtained from the above heat-shrinkable polyester film and then shrinking the label on the covered object by heat.

Effects of the Invention

Since the heat-shrinkable polyester film of the present invention is produced under the conditions that the mobile amorphous amount which contributes to shrinking is large and the mobile amorphous is not converted to rigid amorphous in the heat treatment process, a heat-shrinkable film having a higher heat shrinkage than conventional films can be provided.

Further, since the heat-shrinkable film is subjected to lengthwise-transverse biaxial drawing, the mechanical strength in the longitudinal direction orthogonal to the width direction is high. Therefore, the film can be very efficiently mounted to a container such as a bottle within a short time when used as a label for a PET bottle or the like, and the satisfactory finish with extremely reduced wrinkles and insufficient shrinkage can be exhibited when the film is shrunk by heat. Moreover, since the film strength is large, the processing properties at the time of printing processing and tubing processing are good.

Further, since the shrinkage stress of the film does not attenuate much and is kept high after 30 seconds from the initiation of shrinking, the film exhibits excellent followability even though a container is thermally expanded at the time of heating in the label mounting process, and the label is difficult to be slackened to thereby achieve a good appearance. In addition, the perforation opening property as a label is satisfactory, the label can be cleanly cut along the perforations from the start of tearing to the end of tearing when opened.

Moreover, since the heat-shrinkable polyester film of the present invention is a film produced by being biaxially drawn lengthwisely and transversely, the film can be very efficiently produced. Further, with regard to the heat-shrinkable polyester film of the present invention, the adhesive force at the time of bonding front and back surfaces (or two front or back surfaces) together by a solvent is extremely high, and the film can be suitably used for various cover labels and the like including a label for a PET bottle and the like.

A package packaged with a label obtained from the heat-shrinkable polyester film of the present invention has a beautiful appearance.

BRIEF DESCRIPTION OF THE DRAWINGS

FIG. 1 shows reverse heat flow chart of the film in Example 1 measured by the temperature modulated DSC.

FIG. 2 is an explanatory illustration showing a shape of a test specimen for the measurement of the right-angled tearing strength.

FIG. 3 shows shrinkage stress curves of the films in Example 1 and Comparative Example 1.

MODE FOR CARRYING OUT THE INVENTION

As described in Patent Documents 2 and 3, the present inventors have found that, in order to obtain a heat-shrinkable polyester film having high mechanical strength in the longitudinal direction and favorable perforation opening property, it is necessary that "molecules not contributed to shrinkage force while being oriented in the longitudinal direction" are present in a film. As a result, a method of drawing in the width direction after drawing in the film lengthwise direction (longitudinal direction), a so-called lengthwise-transverse drawing method, is adopted. In the lengthwise-transverse drawing method, an intermediate heat treatment is performed before the drawing in the width direction in order to relax the shrinkage force in the lengthwise direction after the drawing in the lengthwise direction.

One of the techniques for obtaining more highly shrinkable films is a means of increasing the amount of a monomer component (hereinafter simply referred to as amorphous component) which constitutes a unit capable of forming amorphous in a film. With regard to the film obtained by a conventional transverse uniaxial drawing method, it has been found that when the amount of the amorphous component is increased, the shrinkage increases corresponding to the increased amount. It has, however, been found out that, with regard to the film obtained by the lengthwise-transverse drawing method found by the present inventors, even though the amount of the amorphous component is increased, the shrinkage does not increase corresponding to the increased amount. Further increased amount of the amorphous component leads to large irregularity in thickness, causing deterioration in productivity.

The present inventors have further studied and then found out that there is little correlation between crystallinity and heat shrinkage, or between heat of fusion and heat shrinkage. From these findings, the present inventors have considered that polyester is not separated into two phases of a crystal phase and an amorphous phase, but separated into three phases of a crystal phase, a mobile amorphous phase, and a rigid amorphous phase.

The rigid amorphous is in an intermediate state between crystal and mobile amorphous (conventional full amorphous), in which the molecular motion is frozen even at a glass transition temperature (Tg) or higher, and is in a fluid state at a temperature higher than Tg (e.g., Minoru Todoki, "DSC (3)-Glass Transition of Polymers-", The Society of Fiber Science and Technology Japan (Sen'i To Kogyo), Vol. 65, No. 10 (2009)). The rigid amorphous amount (ratio) is expressed by the expression, 100%-crystallinity-mobile amorphous amount.

When studied the relation between the mobile amorphous amount and the heat shrinkage, the present inventors have found out that these two correlate each other. Further, when the mobile amorphous amounts in a undrawn sheet, a film after lengthwise drawing, a film after final heat treatment and the like are measured, the present inventors have considered that, of the films after the lengthwise drawing and the intermediate heat treatment, a film in which the mobile amorphous amount greatly reduces as compared with the undrawn film fails to exhibit a high heat shrinkage and the mobile amorphous is converted to rigid amorphous.

Therefore, while considering the conditions of lengthwise drawing or intermediate heat treatment, and the relaxation conditions in the lengthwise direction, the present inventors have continued studying to find out an amorphous component in which the ratio of conversion from mobile amorphous to rigid amorphous under a drawing process or heat treatment is small, and the amount of conversion from rigid amorphous to mobile amorphous under relaxation treatment in the drawing process or the like is large. The present invention has been completed based on this finding. The mobile amorphous amount can be obtained from the difference in specific heat capacity $\Delta C_p$ between at a lower and a higher temperature than Tg when a reverse heat flow is measured with a temperature modulated DSC. The detailed measuring method will be described later.

The polyester used in the present invention is a polyester whose main constituent is ethylene terephthalate unit. Namely, it contains 50 mol % or more, preferably 60 mol % or more, and further preferably 70 mol % or more of ethylene terephthalate unit with the total constituting units of the polyester being 100 mol %.

Other dicarboxylic acid components constituents the polyester of the present invention can include aromatic dicarboxylic acids such as isophthalic acid, ortho-phthalic acid, and 2,6-naphthalenedicarboxylic acid; aliphatic dicarboxylic acids such as adipic acid, azelaic acid, sebacic acid and decanedicarboxylic acid; and alicyclic dicarboxylic acid such as 1,4-cyclohexanedicarboxylic acid. Of these, examples of the amorphous monomer which can be an amorphous component having a small ratio of conversion from mobile amorphous to rigid amorphous or an amorphous component having a large ratio of conversion from rigid amorphous to mobile amorphous include isophthalic acid, ortho-phthalic acid, and the like.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage.

Diol components constitute the polyester include aliphatic diols such as ethylene glycol, 1,3-propanediol, 2,2-diethyl-1,3-propanediol, 2-n-butyl-2-ethyl-1,3-propanediol, 2,2-iso-propyl-1,3-propanediol, 2,2-di-n-butyl-1,3-propanediol, 1,4-butanediol, neopentyl glycol and hexanediol; alicyclic diols such as 1,4-cyclohexanedimethanol; and aromatic diols such as bisphenol A.

Of these, as an amorphous component having a small ratio of conversion from mobile amorphous to rigid amorphous or an amorphous component having a large ratio of conversion from rigid amorphous to mobile amorphous, cyclic diols such as 1,4-cyclohexanedimethanol and diols having 3 to 6 carbon atoms (for example, 1,3-propanediol, 1,4-butanediol, neopentyl glycol, hexanediol, etc.) are preferably used. In particular, when 1,4-butanediol or neopentyl glycol is used, a polyester which satisfies the requirements for the present invention can be easily obtained.

Further, the polyester used for the heat-shrinkable polyester film of the present invention preferably has 17 mol % or more of the sum of an amorphous component in 100 mol % of the polyhydric alcohol component and in 100 mol % of the polybasic carboxylic acid component (that is, in 200 mol % of the total) in the whole polyester resin, more preferably 18 mol % or more, further more preferably 19 mol % or more, and particularly preferably 20 mol % or more. The upper limit of the total of amorphous components is not particularly limited, but 30 mol % or more is preferable. When the amount of amorphous components is set within the above-mentioned range, a polyester having a glass transition point (Tg) being adjusted to 60 to 80° C. is obtained.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using a polyester containing these diols or these polyhydric alcohols is hard to achieve a necessary high shrinkage. Furthermore, in a polyester used in the heat-shrinkable polyester film of the present invention, it is also preferable not to contain diethylene glycohol, triethylene glycol, or polyethylene glycol.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin for forming the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction and after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

It is also possible to conduct corona treatment, coating treatment, frame treatment etc. on the heat-shrinkable polyester film of the present invention in order to enhance adhesiveness of film surface.

Then, the properties of the heat-shrinkable polyester film of the present invention will be described. With regard to the heat-shrinkable polyester film of the present invention, the heat shrinkage in the width direction (the main shrinkage direction) of the film which is calculated from the lengths before and after shrinkage obtained by dipping the film in a no-load state in hot water of 98° C. for 10 seconds and immediately dipping the film in water of 25° C.±0.5° C. for 10 seconds according to the Equation 1 is not less than 55% and not more than 90%.

Heat shrinkage={(length before shrinkage−length after shrinkage)/length before shrinkage}×100 (%)    Equation 1

When the hot-water heat shrinkage in the width direction at 98° C. is less than 55%, the demand for the high shrinkable film which covers the whole container (so-called full label) cannot be satisfied as well as the shrinkage amount is small. Therefore, strains, insufficient shrinkage, wrinkles, slack and the like are generated on a label after heat shrinkage in the case of being used as the label. The hot-water heat shrinkage at 98° C. is preferably 65% or more, and more preferably 75% or more. Since the degree of demand for the film having a hot-water heat shrinkage in the width direction at 98° C. exceeds 90% is low, the upper limit of the hot-water heat shrinkage is set to 90%.

Moreover, with regard to the heat-shrinkable polyester film of the present invention, the hot-water heat shrinkage at 98° C. in the longitudinal direction (the direction orthogonal to the main shrinking direction) of the film when measured in the same manner as above is preferably not less than −5% and not more than 12%. If the hot-water heat shrinkage in the longitudinal direction at 98° C. is less than −5%, the film is excessively extended by heating, so that it is not preferred because at the time of being used as a label for a bottle, a satisfactory shrinkage appearance cannot be attained. Conversely, if the hot-water heat shrinkage in the longitudinal direction at 98° C. is more than 12%, the label after heat shrinkage is shortened (the height of the label reduces), so that it is not preferred as a full label because the label area becomes smaller, and it is not preferred because strains are easily generated on the label after heat shrinkage. The upper limit of the hot-water heat shrinkage in the longitudinal direction at 98° C. is preferably 10% or less, more preferably 7% or less, further preferably 3% or less, particularly preferably 0% or less, and most preferably less than 0%.

In Patent Documents 2 and 3, the shrinkage in the longitudinal direction has been adjusted to 0% or more (in Example, 4% at the minimum), 12% or less, or 15% or less by controlling the intermediate heat treatment temperature and the conditions of relaxation in the longitudinal direction. That is, since the film is drawn in the longitudinal direction according to the methods disclosed in these documents, it has been extremely difficult to make the hot-water heat shrinkage force in the longitudinal direction below zero. This is because when a film after lengthwise drawing is subjected to drawing in the width direction, a necking force is also applied in the lengthwise direction under a transverse drawing stress, so that the film is shrunk a little in the lengthwise direction as well. Then, the present inventors have successfully increased the mobile amorphous amount by more appropriately adjusting the intermediate heat treatment temperature and the relaxation ratio in the longitudinal direction. Since the mobile amorphous is fully amorphous, the more the mobile amorphous is present, the smaller the necking stress at the time of transverse drawing becomes, which enables the shrinkage in the lengthwise direction to be smaller. According to the present invention, it is considered that a film having a shrinkage in the longitudinal direction of below zero can be provided by increasing the mobile amorphous amount, even though the film is drawn in the longitudinal direction.

With regard to the heat-shrinkable polyester film of the present invention, the difference in specific heat capacity $\Delta C_p$ (equivalent to the mobile amorphous amount) between at a lower and a higher temperature than Tg when a reverse heat flow is measured with a temperature modulated DSC needs to be not less than 0.1 J/(g·°C.) and not more than 0.7 J/(g·°C.). As shown in FIG. 1, with regard to a film sample, when a reverse heat flow is measured with a temperature modulated DSC, the baseline is shifted at a temperature equivalent to Tg. The difference of the values between before and after shifting is referred to as a difference in specific heat capacity $\Delta C_p$, and is equivalent to the mobile amorphous amount. If the $\Delta C_p$ is smaller than 0.1 J/(g·°C.), the mobile amorphous amount is small, which fails to achieve high heat shrinkage. The $\Delta C_p$ is, therefore, preferably 0.15 J/(g·°C.) or more, and more preferably 0.2 J/(g. C) or more. Although the $\Delta C_p$ may exceed 0.7 J/(g·°C.), about 0.7 J/(g·°C.) is the upper limit in the film-forming method of biaxially drawing a film lengthwisely and transversely according to the present invention.

In the heat-shrinkable polyester film of the present invention, tensile breaking strength in the longitudinal direction is preferably 70 MPa or more and 150 MPa or less. The measurement for the tensile breaking strength is performed by a method described in Examples. When the tensile breaking strength in the longitudinal direction is less than 70 MPa, it is not preferable because "stiffness" becomes weak when attached on a bottle etc. as a label. Further, according to the drawing method of the present invention, it is difficult that the tensile breaking strength exceeds 150 MPa. The tensile breaking strength is more preferably 90 MPa or more, and further preferably 110 MPa or more. The tensile breaking strength in the longitudinal direction cannot be within the above-mentioned range unless the lengthwise drawing process is conducted.

With regard to the heat-shrinkable polyester film according to the present invention, the shrinkage stress in the longitudinal direction measured in hot air of 90° C. is preferably not less than 2 MPa and not more than 14 MPa, and the shrinkage stress after 30 seconds from the initiation of measurement is preferably not less than 60% and not more than 100% relative to the maximum shrinkage stress. In this connection, the measurement for the shrinkage stress is performed by a method described in Examples.

If the maximum shrinkage stress at 90° C. in the width direction of the film is less than 2 MPa, it is not preferred because at the time of being used as a label for a bottle, the label is slackened and may not be closely brought into contact with the bottle. The maximum shrinkage stress at 90° C. is more preferably not less than 4 MPa and further preferably not less than 5 MPa. Conversely, when the maximum shrinkage stress at 90° C. is not less than 14 MPa, it is not preferred because strains are easily generated on the label after heat shrinkage. The maximum shrinkage stress at 90° C. is more preferably not more than 13.5 MPa and further preferably not more than 13 MPa.

The shrinkage stress at 90° C. in the longitudinal direction of the film after 30 seconds from the initiation of measurement is preferably not less than 60% and not more than 100% relative to the above maximum shrinkage stress. That is, the heat-shrinkable polyester film of the present invention features specific heat shrinkage properties such that the shrinkage stress almost comparable to the maximum heat shrinkage stress is developed even after 30 seconds from the initiation of shrinking by heat. In order to prevent such a situation that at the time of covering a bottle with a label and shrinking the label by heating, the followability of the label becomes poor in the case where the bottle is allowed to expand by heating and the label is slackened when the temperature of the bottle is lowered after shrinkage and then the heat expansion is eliminated, the shrinkage stress after 30 seconds/maximum shrinkage stress (hereinafter, the stress ratio) of the heat-shrinkable polyester film is preferably less than 60%. The stress ratio is more preferably not less than 75%, further preferably not less than 80%, and especially preferably not less than 90%. Although a higher stress ratio is preferred because the followability is more improved, it is improbable that the shrinkage stress after 30 seconds from the initiation of measurement exceeds the maximum shrinkage stress, and therefore the upper limit thereof is 100%.

In the heat-shrinkable polyester film of the present invention, when right-angled tearing strength per unit thickness in the longitudinal direction after being shrunk by 10% in the width direction in hot water at 80° C., the right-angled tearing strength per unit thickness in the longitudinal direction is preferable 180 N/mm or more and 350 N/mm or less. The measurement for the right-angled tearing strength is performed by a method described in Examples.

When the right-angled tearing strength is less than 180 N/mm, a situation in which the film is easily torn by an impact such as falling during transportation is possibly caused when the film is used as a label, whereby the case is unpreferred. In order to prevent from coming to have poor cutting property (easiness of tearing) at an early stage of tearing a label, the right-angled tearing strength is preferably 350 N/mm or less. The right-angled tearing strength is more preferably 250 N/mm or more, further preferably 280 N/mm or more. The right-angled tearing strength is more preferably 330 N/mm or less.

The thickness of the heat-shrinkable polyester film of the present invention is not particularly limited, but 10 μm or more and 70 μm or less is preferable. The heat-shrinkable polyester film of the present invention preferably has a haze value of 2% or more and 13% or less. When the haze value exceeds 13%, it is not preferable because transparency becomes bad, so that there is a probability that appearance becomes bad in a label production. Additionally, the haze value is more preferably 11% or less, and particularly preferably 9% or less. Further, the smaller the haze value, the better, but the lower limit is about 2% from considerations that a predetermined amount of a lubricant may be added to the film in order to provide slipperiness necessary for practical use or the like.

In a method for producing the heat-shrinkable polyester film of the present invention, the foregoing polyester raw material is melt-extruded by an extruder to form an undrawn film, and the undrawn film is biaxially drawn by a predetermined method shown below and heat-treated. In this connection, polyester can be obtained by allowing the suitable dicarboxylic acid component and diol component mentioned above to undergo a polycondensation by a known method. Moreover, usually, two or more kinds of chip-like polyesters are mixed to be used as raw materials.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after longitudinally drawing is annealed, and then quenched, and next heat-treated once, the film after the heat treatment is cooled in a predetermined condition, and then drawn in the width direction under a predetermined condition, and heat-treated once again, thereby obtaining a heat-shrinkable polyester film of the present invention. Hereinafter, a preferable film forming process to obtain a heat-shrinkable polyester film of the present invention is described in detail by considering the difference from the film forming process of the conventional heat-shrinkable polyester film.

[Method for Producing the Heat-Shrinkable Polyester Film]

The heat-shrinkable polyester film of the present invention is formed by the following procedures.

(1) Control of lengthwise drawing condition
(2) Intermediate heat treatment after lengthwise drawing
(3) Natural cooling between intermediate heat treatment and transverse drawing (shutoff of heating)
(4) Forced cooling of film after natural cooling
(5) Control of transverse drawing condition
(6) Heat treatment after transverse drawing
(7) During the course of the above-mentioned production process, at least two processes in which the film is allowed to relax in the longitudinal direction are provided.

Hereinafter, each of the procedures mentioned above will be sequentially described.

(1) Control of Lengthwise Drawing Condition

In the production of the film according to the present invention by a lengthwise-transverse drawing method, it is necessary to set the drawing temperature to a temperature of not lower than Tg and not higher than Tg+30° C. and to lengthwise drawing the film so as to allow the draw ratio to be not less than 3.3 times and not more than 4.6 times. With regard to the lengthwise drawing, either of single-stage drawing and multi-stage drawing which is two or more-stage drawing can be used.

When the drawing temperature is excessively high or the total lengthwise draw ratio becomes large at the time of drawing a film in the lengthwise direction, the amorphous molecule is drawn out, so that the heat shrinkage in the longitudinal direction tends to become large. Moreover, when the lengthwise draw ratio is too large, it is not preferred because oriented crystallization of the film after the lengthwise drawing progresses, the mobile amorphous is converted to rigid amorphous, the rigid amorphous is further crystallized, breakage is easily generated in the transverse drawing process, and the shrinkage in the transverse direction after the transverse drawing also lowers. Therefore, the upper limit of the lengthwise draw ratio is not more than 4.6 times. The upper limit of the lengthwise draw ratio is more preferably not more than 4.5 times, and further preferably not more than 4.4 times. In contrast, when the lengthwise draw ratio is too small, although the shrinkage in the longitudinal direction is reduced, it is not preferred because the degree of molecular orientation in the longitudinal direction is reduced, the right-angled tearing strength in the longitudinal direction is increased, and the tensile breaking strength is reduced. The lower limit of the lengthwise draw ratio is preferably 3.3 times, more preferably 3.4 times, further preferably 3.5 times.

(2) Intermediate Heat Treatment after Lengthwise Drawing

In order to be thermally relaxed molecules oriented in the longitudinal direction, after lengthwise drawing, heat treatment is conducted. After an undrawn film is lengthwisely drawn, under a state that both edges in the width direction are held by clips in a tenter, it is necessary to conduct heat treatment (hereinafter called intermediate heat treatment) over a period of not shorter than 6.0 seconds and not longer than 12.0 seconds at a temperature of Tg+40° C. or more and Tg+60° C. or less.

The temperature of the intermediate heat treatment is more preferably not lower than Tg+41° C., further preferably not lower than Tg+42° C., more preferably not higher than Tg+58° C., and further preferably not higher than Tg+56° C. When the temperature of the intermediate heat treatment is excessively high, the molecular chains oriented by the lengthwise drawing are converted to a crystal, so that the film fails to obtain high temperature shrinkage after transverse drawing. On the other hand, it is necessary that the time for the intermediate heat treatment is appropriately adjusted within a range of not shorter than 6.0 seconds and not longer than 12.0 seconds depending on the composition of raw materials. In the intermediate heat treatment, the quantity of heat given to the film is of importance, and when the temperature of the intermediate heat treatment is low, an extended period of the intermediate heat treatment is required. However, since the facilities are made more gigantic when the treatment time for the intermediate heat treatment is too long, it is preferred to appropriately adjust the process by the modification of the temperature and the treatment time.

By setting the temperature of the intermediate heat treatment to be not lower than Tg+40° C., the degree of molecular orientation in the longitudinal direction increased to some extent can be maintained, and therefore, it is possible to maintain the tensile breaking strength in the longitudinal direction high while maintaining the right-angled tearing strength low. In contrast, by controlling the temperature of the intermediate heat treatment within a range of not higher than Tg+60° C., it is possible to suppress the crystallization of the film and to lower the shrinkage in the longitudinal direction not by crystallization but by conversion from the mobile amorphous to the rigid amorphous. The crystal is in a state of extremely strongly restrained orientation in which the molecular chains are folded, so that once the film is crystallized, the amount of the crystal does not decrease even though the drawing method is changed thereafter. The rigid amorphous is, however, in a state of loosely restrained orientation as compared with the crystal, so that the state can be converted from the rigid amorphous to the mobile amorphous by relaxation in the subsequent drawing process and the like. For this reason, by setting the temperature of the intermediate heat treatment within a range of not higher than Tg+60° C., it is possible to suppress the crystallization of the film to increase the shrinkage in the width direction. Moreover, by controlling the temperature of the intermediate heat treatment within a range of not higher than Tg+60° C., it is possible to suppress the crystallization of the surface layer of the film to maintain the solvent adhesive strength high, and furthermore, it is also possible to reduce the irregularity of thickness in the longitudinal direction.

(3) Natural Cooling (Shutoff of Heating) Between Intermediate Heat Treatment and Transverse Drawing In production of a film by the lengthwise-transverse drawing method in the present invention, it is necessary to conduct intermediate heat treatment after lengthwise drawing, however, after the lengthwise drawing and intermediate heat treatment, the film is necessary to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing and intermediate heat treatment is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage in the transverse direction cannot be increased sufficiently. Conversely, 3.0 seconds are sufficient time for passing through the intermediate zone, and even though setting a longer time than that, it will lead to needlessness of equipment, which is not preferable. The lower limit of the time for passing through the intermediate zone is preferably 0.7 seconds or more, and more preferably 0.9 seconds or more. Further, the upper limit of the time for passing through the intermediate zone is preferably 2.8 seconds or less, and more preferably 2.6 seconds or less.

(4) Forced Cooling of the Film after Natural Cooling

In production of a film by the lengthwise-transverse drawing method in the present invention, the film naturally cooled is not transversely drawn as it is, but it is necessary that a temperature of the film is actively forced cooling to be Tg or more and Tg+40° C. or less. By conducting such forced cooling treatment, it becomes possible to obtain a film with favorable perforation opening property as a label. Further, the temperature of the film after forced cooling is more preferably not less than Tg+2° C., further preferably not less than Tg+4° C., more preferably not more than Tg+35° C., and further preferably not more than Tg+30° C.

In forcedly cooling a film, when the temperature of the film after forced cooling keeps exceeding Tg+40° C., shrinkage in the width direction of the film becomes low and shrinkage property becomes insufficient as a label, but by controlling the temperature of the film after forcedly cooling at Tg+40° C. or less, it becomes possible to maintain shrinkage in the width direction of the film high. Further, if the temperature of the film after forced cooling keeps exceeding Tg+40° C., the stress of transverse drawing carried out after cooling becomes small, the shrinkage stress in the width direction becomes small, and the followability of the film to a bottle becomes poor. By forcedly cooling a temperature of the film after cooling to be Tg+40° C. or less, it becomes possible to maintain the shrinkage stress in the width direction large.

Further, in forcedly cooling the film, if the temperature of the film after forced cooling keeps exceeding Tg+40° C., the stress of transverse drawing carried out after cooling becomes small, and the irregularity of thickness in the width direction tends to become large, but by forcedly cooling a temperature of the film after cooling to be Tg+40° C. or less, it becomes possible to increase the stress of transverse drawing carried out after cooling and to reduce the irregularity of thickness in the width direction.

(5) Control of Transverse Drawing Condition

The transverse drawing is carried out such that the ratio becomes 3 times or more and 7 times or less at Tg+10° C. or more and Tg+40° C. or less, in a state that both edges in the width direction are held by clips in a tenter. By conducting the transverse drawing in such a predetermined condition, it becomes possible to orient molecules to the width direction to exhibit high shrinkage force in the width direction, and it becomes possible to obtain a film with good perforation opening property as a label. The temperature of transverse drawing is more preferably Tg+13° C. or more, further preferably Tg+16° C. or more, more preferably Tg+37° C. or less, and more preferably Tg+34° C. or less. On the other hand, the transverse drawing ratio is preferably 3.5 times or more, more preferably 4 times or more, preferably 6.5 times or less, and more preferably 6 times or less.

The shrinkage in the longitudinal direction is heightened and the shrinkage in the width direction is easily lowered when the drawing temperature is higher than Tg+40° C. at the time of drawing a film in the transverse direction. However, it is preferred that the drawing temperature be controlled within a range of not higher than Tg+40° C. because it becomes easy to suppress the shrinkage in the longitudinal direction low and to maintain the shrinkage in the width direction high. Moreover, the stress of transverse drawing carried out after cooling becomes small, and the irregularity of thickness in the width direction tends to become large, when the drawing temperature is higher than Tg+40° C. However, by controlling the drawing temperature within a range of not higher than Tg+40° C., it becomes possible to increase the stress of transverse drawing carried out after cooling and to reduce the irregularity of thickness in the width direction.

On the other hand, if the drawing temperature is less than Tg+10° C., it is not preferred because the molecular orientation to the width direction becomes excessively high, so that breakage tends to occur in transverse drawing, and further because voids inside the film are increased, so that haze of the film becomes large.

(6) Heat Treatment after Transverse Drawing (Final Heat Treatment)

It is necessary that the film after transverse drawing be finally subjected to a heat treatment over a period of not shorter than 1 second and not longer than 9 seconds at a temperature of not lower than Tg and not higher than Tg+50° C. in a state that both edges in the width direction are held by clips in a tenter. If the heat treatment temperature is higher than Tg+50° C., it is not preferred because the mobile amorphous is reduced, the shrinkage in the width direction is lowered, and the heat shrinkage at 98° C. is less than 55%. Moreover, when the heat treatment temperature is lower than Tg, it is not preferred because the film is not allowed to relax sufficiently in the width direction and the degree of shrinkage in the width direction (the so-called natural shrinkage) is increased with the lapse of time at the time of allowing a final product to be stored under ordinary temperature condition. Moreover, although it is preferred that the heat treatment time be set as long as possible, the facilities are made more gigantic when the treatment time is too long, and therefore it is preferred that the treatment time be set to not longer than 9 seconds.

(7) Relaxation Process in Longitudinal Direction

In order to increase the mobile amorphous and lower the shrinkage in the longitudinal direction, it is preferable to thermally relax molecules oriented in the longitudinal direction by lengthwise drawing. There is a drawback that when the residual shrinkage stress in the longitudinal direction of the film after lengthwise drawing is large, the hot-water heat shrinkage in the longitudinal direction of the film after transverse drawing increases to thereby deteriorate the shrinkage finishing properties. Although heat treatment in the transverse drawing process is effective to lower the hot-water heat shrinkage in the longitudinal direction of the film, the relaxation by heat alone increases a crystal in the film, so that it is not suitable to make the shrinkage in the width direction higher.

As the result of studies, the present inventors have found that a bulk amorphous which is converted from mobile amorphous to rigid amorphous by drawing or heat treatment can be converted from rigid amorphous to mobile amorphous by relaxation. Therefore, drawing in the longitudinal direction and then relaxing in the longitudinal direction is one of the effective means of making the shrinkage in the width direction higher and lowering the shrinkage in the longitudinal direction. Further, the present inventors have studied a means of controlling the right-angled tearing strength and the tensile breaking strength both in the longitudinal direction by giving some rigid amorphous or crystal to the molecular chains in the longitudinal direction, even though relaxing in the longitudinal direction. Then, the present inventors have found that a film can be controlled by relaxing the film in the longitudinal direction according to the means shown below. It is desired that any two of the following processes (i) to (iii), or all the three processes are carried out.

(i) A process of heating a film after lengthwise drawing at a temperature of not lower than Tg and not higher than Tg+60° C. and subjecting the film to relaxation of not less than 10% and not more than 50% in the longitudinal direction over a period of not shorter than 0.05 seconds and not longer than 5 seconds using rolls having a speed difference therebetween. As a heating means, any of a temperature conditioning roll, near infrared rays, far infrared rays, a hot air heater and the like can be used.

(ii) A process of subjecting a film to relaxation of not less than 21% and not more than 40% in the longitudinal direction over a period of not shorter than 0.1 seconds and not longer than 12 seconds by reducing the distance between clips for grasping opposite to each other in a tenter in the intermediate heat treatment process.

(iii) A process of subjecting a film to relaxation of not less than 21% and not more than 40% in the longitudinal direction over a period of not shorter than 0.1 seconds and not longer than 9 seconds by reducing the distance between clips for grasping opposite to each other in a tenter in the final heat treatment process.

Hereinafter, each of the processes will be described.

(i) Relaxation after Lengthwise Drawing

It is desirable to heat a film after lengthwise drawing at a temperature of not lower than Tg and not higher than Tg+60° C. and subject the film to relaxation of not less than 10% and not more than 50% in the longitudinal direction over a period of not shorter than 0.05 seconds and not longer than 5.0 seconds using rolls having a speed difference therebetween. When the temperature is lower than Tg, it is not preferred because the film after lengthwise drawing is not allowed to shrink and relaxation cannot be performed. In contrast, when the temperature is higher than Tg+60° C., it is not preferred because the film is crystallized and the transparency and the like become poor. The film temperature at the time of relaxation after lengthwise drawing is more preferably not lower than Tg+10° C. and not higher than Tg+55° C., and further preferably not lower than Tg+20° C. and not higher than Tg+50° C.

Moreover, the time for performing relaxation in the longitudinal direction of the film after lengthwise drawing is preferably not shorter than 0.05 seconds and not longer than 5 seconds. When the time is shorter than 0.05 seconds, it is not preferred because the irregularity in relaxation is generated unless the temperature is allowed to be higher than Tg since the time for relaxation becomes short. Moreover, although the film has no problem as a film when the time for relaxation is longer than 5 seconds since relaxation can be performed at low temperatures, it is preferred to appropriately adjust the process by the modification of the temperature and the time since the facilities are made more gigantic. The relaxation time is more preferably not shorter than 0.1 seconds and not longer than 4.5 seconds, and further preferably not shorter than 0.5 seconds and not longer than 4 seconds.

If the relaxation ratio in the longitudinal direction of the film after lengthwise drawing is less than 10%, it is not preferred because the molecular orientation in the longitudinal direction is not sufficiently relaxed and the amount of conversion from rigid amorphous to mobile amorphous is reduced. When the relaxation rate in the longitudinal direction of the film after lengthwise drawing is exceeds 50%, it is not preferred because the right-angled tearing strength in the longitudinal direction is increased and the tensile breaking strength in the longitudinal direction is decreased. The relaxation rate of the film after lengthwise drawing is more preferably not less than 15% and not more than 45%, and further preferably not less than 20% and not more than 40%.

Examples of a method for allowing a film after lengthwise drawing to relax include a method of heating a film after lengthwise drawing with a heating apparatus (heating furnace) arranged between rolls and performing relaxation by taking advantage of the speed difference between the rolls; a method of heating a film after lengthwise drawing with a heating apparatus (heating furnace) arranged between a roll and a transverse drawing machine and allowing the speed of the transverse drawing machine to be lower than that of the roll, and the like. As the heating apparatus (heating furnace), any of a temperature conditioning roll, a near infrared ray heater, a far infrared ray heater, a hot air heater and the like can be used.

(ii) Relaxation in the Intermediate Heat Treatment Process

In the intermediate heat treatment process, it is desirable to subject a film to relaxation of not less than 21% and not more than 40% in the longitudinal direction over a period of not shorter than 0.1 seconds and not longer than 12 seconds by reducing the distance between clips for grasping opposite to each other in a tenter. When the relaxation rate is less than 21%, it is not preferred because the molecular orientation in the longitudinal direction is not sufficiently relaxed and the amount of conversion from rigid amorphous to mobile amorphous is reduced. When the relaxation rate in the longitudinal direction of the film after lengthwise drawing is exceeds 40%, it is not preferred because the right-angled tearing strength in the longitudinal direction is increased and the tensile breaking strength in the longitudinal direction is decreased. The relaxation rate is more preferably not less than 22%, more preferably not more than 38%, and further preferably not more than 36%.

Moreover, the time for performing relaxation in the longitudinal direction in the intermediate heat treatment process is preferably not shorter than 0.1 seconds and not longer than 12 seconds. When the time is shorter than 0.1 seconds, it is not preferred because the irregularity in relaxation is generated unless the temperature is allowed to be higher than Tg+40° C. since the time for relaxation becomes short. Moreover, although the film has no problem as a film when the relaxation time is longer than 12 seconds, it is preferred to appropriately adjust the process by the modification of the temperature and the time since the facilities are made more gigantic. The relaxation time is more preferably not shorter than 0.3 seconds and not longer than 11 seconds, and further preferably not shorter than 0.5 seconds and not longer than 10 seconds.

(iii) Relaxation in the Final Heat Treatment Process

In the final heat treatment process, it is desirable to subject a film to relaxation of not less than 21% and not more than 40% in the longitudinal direction over a period of not shorter than 0.1 seconds and not longer than 9 seconds by reducing the distance between clips for grasping opposite to each other in a tenter. When the relaxation rate is less than 21%, it is not preferred because the molecular orientation in the longitudinal direction is not sufficiently relaxed and the amount of conversion from rigid amorphous to mobile amorphous is reduced. When the relaxation rate in the longitudinal direction of the film after lengthwise drawing is exceeds 40%, it is not preferred because the right-angled tearing strength in the longitudinal direction is increased and the tensile breaking strength in the longitudinal direction is decreased. The relaxation rate is more preferably not less than 22%, more preferably not more than 38%, and further preferably not more than 36%.

Moreover, the time for performing relaxation in the longitudinal direction in the final heat treatment process is preferably not shorter than 0.1 seconds and not longer than 9 seconds. When the time is shorter than 0.1 seconds, it is not preferred because the irregularity in relaxation is generated unless the temperature is allowed to be higher than Tg since the time for relaxation becomes short. Moreover, although the film has no problem as a film when the relaxation time is longer than 9 seconds, it is preferred to appropriately adjust the process by the modification of the temperature and the time since the facilities are made more gigantic. The relaxation time is more preferably not shorter than 0.3 seconds and not longer than 8 seconds, and further preferably not shorter than 0.5 seconds and not longer than 7 seconds.

The package of the present invention is a package in which a label provided with a perforation or a notch using the foregoing heat-shrinkable polyester film of the present invention is covered at least on a part of the outer periphery of an object to be packaged and then to shrink by heat. The object to be packaged can be exemplified by PET bottles for beverage and polyethylene-made containers used for shampoos, conditioners and the like, various kinds of bottles, cans, plastic containers for confectionery, a box lunch and the like, paper-made boxes, and the like. In general, in the case where a label using a heat-shrinkable polyester film is covered on the packaging object and heat-shrunk, the label is heat-shrunk by about 5 to 70% and closely attached on the package. Additionally, a label covered on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

The present application claims the benefit of priority to Japanese Patent Application Number 2014-75842 filed on Apr. 1, 2014, and Japanese Patent Application Number 2015-005593 filed on Jan. 15, 2015. The entire contents of the specifications of Japanese Patent Application Number 2014-75842 filed on Apr. 1, 2014, and Japanese Patent Application Number 2015-005593 filed on Jan. 15, 2015 are hereby incorporated by reference.

EXAMPLES

Hereinafter, the present invention is described in more detail by Examples, but the present invention is by no means limited to aspects of the Examples, and it can be suitably modified in the range not departing from the scope of the present invention. Evaluation methods of polyesters and films using in the present invention are as follows.

[Heat Shrinkage (Hot-Water Heat Shrinkage)]

A film was cut into a square of 10 cm×10 cm, treated and heat-shrunk in no load state for 10 seconds in hot water of 98° C.±0.5° C., and then the film was dipped in water of 25° C.±0.5° C. for 10 seconds and taken from water. The dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100 (%)      Equation 1

[Difference in Specific Heat Capacity $\Delta C_p$ Between at a Lower and a Higher Temperature than Tg]

A film was weighed 10 mg in a hermetic aluminum pan using a temperature modulated differential scanning calorimeter (TM DSC) "Q100" (manufactured by TA Instruments), and the weighed film was subjected to a heat only mode at an average heating-up speed of 1° C. Imin in a modulation cycle of 40 seconds to obtain a reverse heat flow. The difference in the specific heat capacity between at a lower and a higher temperature than Tg of the reverse heat flow thus obtained was defined as a difference in specific heat capacity $\Delta C_p$.

[Shrinkage Stress]

A sample of 200 mm in length in the main shrinkage direction and 20 mm in width was cut out of a heat-shrinkable film and measured for the shrinkage stress using a strength and elongation measuring machine with a heating furnace (TENSILON (a registered trademark of ORIENTEC Co., LTD)) manufactured by ORIENTEC Co., LTD (formerly Toyo Baldwin Corporation). The heating furnace was previously heated to 90° C., and the distance between chucks was set to 100 mm. The air blast blown into the heating furnace was once stopped, the door of the heating furnace was opened, the sample was fitted to the chucks, after which the door of the heating furnace was quickly closed and the air blast was restarted. The shrinkage stress was measured over a period of not shorter than 30 seconds, a shrinkage stress (MPa) after 30 seconds from the initiation of measurement was determined, and the maximum value obtained during the measurement was defined as the maximum shrinkage stress (MPa). Moreover, the ratio (percentage) of a shrinkage stress after 30 seconds from the initiation of measurement relative to the maximum shrinkage stress was defined as the stress ratio (%).

[Tensile Breaking Strength]

A test specimen with a strip-like shape of 140 mm in the measurement direction (the width direction of the film) and 20 mm in the direction orthogonal to the measurement direction (the longitudinal direction of the film) was prepared. Using a universal tensile testing machine "DSS-100" (manufactured by SHIMADZU CORPORATION), each of 20 mm grasping margins located at both ends of the test specimen was fixed to a chuck (the distance between chucks of 100 mm), the tensile test was performed under the conditions of an atmospheric temperature of 23° C. and a tensile speed of 200 mm/minute, and the strength (stress) at the time of being torn and broken was defined as the tensile breaking strength.

[Right-Angled Tearing Strength]

A film in a state of being previously slackened was mounted to a rectangular frame having a prescribed length (that is, both ends of the film were allowed to be grasped by the frame). Then, by immersing the film in hot water at 80° C. for about 5 seconds until the slackened film became a tensioned state within the frame (until the slack was eliminated), the film was allowed to shrink by 10% in the width direction. In accordance with JIS K7128-3, a test specimen with a shape shown in FIG. 2 was cut out of this film which had been allowed to shrink by 10%. In FIG. 2, a unit of length is "mm" and R represents a radius. In this connection, at the time of cutting out the test specimen, the longitudinal direction of the film was directed along the tearing direction. Next, both ends (in the width direction) of the test specimen was allowed to be grasped with a universal tensile testing machine ("Autograph" manufactured by SHIMADZU CORPORATION), the tensile test was performed under the condition of a tensile speed of 200 mm/minute, and a maximum load at the time of being completely torn apart in the longitudinal direction of the film was measured. By dividing the maximum load by the thickness of the film, a right-angled tearing strength per unit thickness (N/mm) was calculated.

[Shrinkage Strain of Label]

By bonding both end parts of a heat-shrinkable film with dioxolane, a cylindrical label (a label in which the main shrinkage direction of a heat-shrinkable film was set to the circumferential direction) was prepared. A rectangular-shaped PET bottle having a capacity of 500 ml (215 mm in circumference of the trunk, 87 mm in minimum length of the neck part) was covered with this label, and allowing the label to shrink by heat at a zone temperature of 90° C. with a passing time of 5 seconds using a steam tunnel (model type; SH-1500-L) available from Fuji Astec Inc., the label was mounted to the bottle. In this connection, at the time of covering, in the neck part, a part with a circumference of 103 mm was adjusted so as to be positioned at one end of the label. For evaluating finishing properties after shrinkage, the strain in the direction of 360 degrees at the upper part of the mounted label was measured using a gauge and the maximum value of the strain was determined. The results were evaluated according to the following criteria. When the upper part of the label was insufficient in shrinking, the strain at the lower part of label was determined.

Excellent: maximum strain less than 2.0 mm
Good: maximum strain not less than 2.0 mm and less than 3.0 mm
Poor: maximum strain not less than 3.0 mm

[Height of Label]

Under the same conditions as those for the shrinkage strain of the label mentioned above, a label was mounted to a PET bottle (having a height of 170 mm). The height of the label was measured and the results were evaluated according to the following criteria.

Excellent: The height of the label is not less than 169 mm.
Good: The height of the label is not less than 167 mm and less than 169 mm.
Poor: The height of the label is less than 167 mm.

[Insufficient Shrinking of Label]

Under the same conditions as those for the shrinkage strain of the label mentioned above, a label was mounted to a PET bottle. The shrinking state of the label was evaluated according to the following criteria.

Excellent: There is no slack between the mounted label and the PET bottle, and the label is shrunk to the upper part of the bottle.
Good: There is a slack (less than 1 mm in the label height direction) between the label and the neck part of the PET bottle due to insufficient shrinking.
Poor: There is a slack (not less than 1 mm in the label height direction) between the label and the neck part of the PET bottle due to insufficient shrinking.

[Wrinkles of Label]

Under the same conditions as those for the shrinkage strain of the label mentioned above, a label was mounted to a PET bottle and the occurrence state of wrinkles was evaluated according to the following criteria.

Excellent: The number of wrinkles with a size of not less than 2 mm is zero.
Good: The number of wrinkles with a size of not less than 2 mm is not less than 1 and not more than 2.
Poor: The number of wrinkles with a size of not less than 2 mm is not less than 3.

[Perforation Opening Property]

Under the same conditions as those for the shrinkage strain of the label mentioned above, a label to which perforations were previously provided in the direction orthogonal to the main shrinkage direction was mounted to a PET bottle. The perforation was formed by providing a hole of 1 mm long in the intervals of 1 mm, and two lines of perforations were provided in width 22 mm and length 185 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly not torn along the perforations in the lengthwise direction or thereby to be not able to remove the label from the bottle was counted, and a ratio (%) relative to the total samples of 50 was calculated as a perforation opening defective ratio. If the perforation opening defective ratio is 20% or less, the result is acceptable for practical use.

<Preparation of Polyester Raw Material>

100 mol % of dimethyl terephthalate (DMT) as a dibasic acid component and 100 mol % of ethylene glycol (EG) as a glycol component were placed in a stainless steel autoclave equipped with a stirrer, a thermometer and a partially circulating cooler such that the amount of glycol was 2.2 times the amount of methyl ester in terms of the molar ratio, and an ester exchange reaction was carried out using 0.05 mol % (based on the acid component) of zinc acetate as an ester exchange catalyst while distilling away generated methanol to outside the system. Thereafter, 0.025 mol % (based on the acid component) of antimony trioxide was added as a polycondensation catalyst, and a polycondensation reaction was carried at 280° C. under a reduced pressure of 26.6 Pa (0.2 torr) to obtain polyester (A) having an intrinsic viscosity of 0.70 dl/g. This polyester is polyethylene terephthalate. In production of the polyester (A), $SiO_2$ (Silysia 266 manufactured by FUJI SILYSIA CHEMICAL LTD.) was added as a lubricant in a ratio of 8000 ppm based on polyester. Polyesters (A, B, C, D, E and F) shown in Table 1 were synthesized by the similar process as described above. In the table, IPA is isophthalic acid, NPG is neopentyl glycol, CHDM is 1,4-cyclohexanedimethanol, and BD is 1,4-butanediol. The intrinsic viscosities of polyesters A, B, C, D, E and F were 0.70 dl/g, 0.70 dl/g, 0.73 dl/g, 0.73 dl/g, 0.70 dl/g and 0.80 dl/g, respectively. Each polyester was appropriately formed into a chip.

Compositions of polyester raw material used in Examples and Comparative Examples, and resin compositions and production conditions of films in Examples and Comparative Examples were shown in Tables 1 and 2 respectively.

TABLE 1

| | Composition of polyester raw material (mol %) | | | | | | Added |
|---|---|---|---|---|---|---|---|
| | Dicarboxylic acid component | | Polyvalent alchol component | | | | amount of lubricant |
| Polyester | DMT | IPA | EG | NPG | CHDM | BD | (ppm) |
| A | 100 | 0 | 100 | — | — | — | 8000 |
| B | 100 | 0 | 100 | — | — | — | 0 |
| C | 100 | 0 | 70 | 30 | — | — | 0 |
| D | 100 | 0 | 70 | — | 30 | — | 0 |
| E | 80 | 20 | 100 | — | — | — | 0 |
| F | 100 | 0 | — | — | — | 100 | 0 |

TABLE 2

| | | | | Lengthwise drawing Drawing condition | | Relxation process in the lengthwise direction | | | |
|---|---|---|---|---|---|---|---|---|---|
| | | | | | | After lengthwise drawing | | Relaxation ratio in intermediate heat | Relaxation ratio in final heat |
| | Resin composition | Amount of amorphous component (mol %) | Tg of raw material (° C.) | Temperature (° C.) | Ratio | Furnace ratio (° C.) | Relaxation ratio (%) | treatment process (%) | treatment process (%) |
| Example 1 | A/B/C/F = 5:5:80:10 | 24 | 67 | 78 | 4 | 95 | 30 | 28.6 | 0 |
| Example 2 | A/B/D/F = 5:5:80:10 | 24 | 67 | 78 | 4 | 95 | 30 | 28.6 | 0 |
| Example 3 | A/B/C/E/F = 5:5:60:20:10 | 22 | 67 | 78 | 4 | 105 | 30 | 28.6 | 0 |
| Example 4 | A/B/C/F = 5:5:80:10 | 24 | 67 | 78 | 4 | 105 | 30 | 0 | 28.6 |
| Example 5 | B/C/F = 5:90:5 | 27 | 71 | 78 | 4 | 105 | 40 | 0 | 33.3 |

TABLE 2-continued

| | | | | | | | | |
|---|---|---|---|---|---|---|---|---|
| Example 6 | B/C/F = 5:90:5 | 27 | 71 | 78 | 4 | 105 | 40 | 0 | 33.3 |
| Example 7 | A/B/C/F = 5:25:60:10 | 18 | 67 | 78 | 4 | 105 | 30 | 28.6 | 0 |
| Example 8 | A/B/C/E = 5:5:60:30 | 24 | 75 | 80 | 4.5 | 100 | 15 | 24.7 | 21.9 |
| Example 9 | A/B/C/F = 5:5:80:10 | 24 | 67 | 78 | 4 | 50 | 0 | 30 | 28.6 |
| Comparative Example 1 | A/B/C/F = 5:5:80:10 | 24 | 67 | | | No transverse drawing | | | |
| Comparative Example 2 | A/B/C/F = 5:5:80:10 | 24 | 67 | 78 | 4 | 95 | 20 | 0 | 12.5 |
| Comparative Example 3 | A/B/C = 5:25:70 | 21 | 75 | 78 | 4 | 105 | 30 | 0 | 7.1 |
| Comparative Example 4 | A/B/C/F = 5:25:60:10 | 18 | 67 | 78 | 4 | 105 | 0 | 0 | 0 |

| | Intermediate heat treatment process | | | Temperature of cooling process (° C.) | Transverse drawing | | Final heat treatment temperature (° C.) |
|---|---|---|---|---|---|---|---|
| | Temperature (° C.) | Time (Sec) | Presence of intermediate zone | | Drawing temperature (° C.) | Ratio | |
| Example 1 | 123 | 8 | Present | 100 | 95 | 5 | 98 |
| Example 2 | 123 | 8 | Present | 100 | 95 | 5 | 98 |
| Example 3 | 123 | 8 | Present | 100 | 95 | 5 | 98 |
| Example 4 | 123 | 8 | Present | 100 | 95 | 5 | 98 |
| Example 5 | 118 | 8 | Present | 100 | 95 | 5 | 98 |
| Example 6 | 118 | 8 | Present | 100 | 95 | 6 | 98 |
| Example 7 | 123 | 8 | Present | 100 | 95 | 5 | 98 |
| Example 8 | 120 | 10 | Present | 100 | 95 | 7 | 98 |
| Example 9 | 123 | 8 | Present | 100 | 95 | 5 | 98 |
| Comparative Example 1 | 100 | 8 | Present | 100 | 70 | 5 | 80 |
| Comparative Example 2 | 140 | 8 | Present | 100 | 95 | 4 | 98 |
| Comparative Example 3 | 145 | 8 | Present | 100 | 100 | 5 | 101 |
| Comparative Example 4 | 123 | 8 | Present | 100 | 95 | 5 | 98 |

Example 1

Polyester A, polyester B, polyester C and polyester F as described above were mixed in the weight ratio of 5:5:80:10 and the mixed resin was introduced into an extruder. The mixed resin was molten at 280° C. and extruded from a T-die and then quenched by winding it around a rotating metal roll set at a surface temperature of 30° C. An undrawn film with a thickness of 200 μm was obtained. The take-off speed (rotational speed of the metal roll) of the undrawn film at this time was about 20 m/min. Tg of the undrawn film was 67° C.

The obtained undrawn film was introduced to a lengthwise drawing machine in which a plurality of rolls were continuously disposed, by using the rotating speed difference between rolls, the film was drawn by 4 times in the lengthwise direction at 78° C.

The film immediately after the lengthwise drawing was passed through a heating furnace. The inside of the heating furnace was heated by means of a hot-air heater, and the preset temperature was set to 95° C. By taking advantage of the speed difference between a roll at the inlet side and a roll at the outlet side of the heating furnace, the film was allowed to relax by 30% in the longitudinal direction. The time for relaxation was set to 0.6 seconds.

The film after the relaxation treatment was introduced to a transverse drawing machine (tenter) and made to pass sequentially through an intermediate heat treatment zone, an intermediate zone (natural cooling zone), a cooling zone (forced cooling zone), a transverse drawing zone and a final heat treatment zone. In the intermediate zone in the tenter, hot wind from the intermediate heat treatment zone and cooling wind from the cooling zone were shut off such that when a rectangular strip of paper is hung down in the vertical direction in a state that a film is not passed through, the strip of paper hangs down almost completely in the vertical direction. When a film passes through, the distance of the film and a shielding plate was adjusted such that the most part of associated air accompanied by movement of the film was shut off by the shielding plate provided between the intermediate heat treatment zone and the intermediate zone. In addition, when a film passes through, the distance of the film and a shielding plate was adjusted such that the most part of associated air accompanied by movement of the film was shut off by the shielding plate provided between the intermediate zone and the cooling zone.

The film which was subjected to relaxation after lengthwise drawing was introduced to the tenter, and was then heat-treated at 123° C. for 8 seconds in the intermediate heat treatment zone. At this time, the relaxation ratio in the longitudinal direction was 28.6%. Next, the film after the intermediate heat treatment was introduced to the intermediate zone, and was naturally cooled by passing through the intermediate zone (passing time=about 1 second). Thereafter, the film after the natural cooling was introduced to the cooling zone, and actively cooled by blowing wind of low temperature until the surface temperature of the film became 100° C. Then, the film was drawn by 5 times in the width direction (transverse direction) at 95° C.

The film after transverse drawing was introduced into a final heat treatment zone, and subjected to a heat treatment at 98° C. for 5 seconds in the final heat treatment zone. Afterward, the film was cooled, both edge parts thereof were cut away, and the film of 500 mm in width was wound into a roll to continuously produce a biaxially drawn film with a thickness of 20 μm of a prescribed length. The resulting film was evaluated for various properties in the above-mentioned manner. The evaluation results are shown in Table 3. Moreover, a reverse heat flow chart obtained from the temperature modulated DSC measurement is shown in FIG. 1 and the shrinkage stress curve is shown in FIG. 3.

Example 2

A film with a thickness of 20 μm was produced in the same manner as that in Example 1 except that the polyester C was changed to polyester D. The Tg of the undrawn film was 67° C. The evaluation results are shown in Table 3.

Example 3

A film with a thickness of 20 μm was produced in the same manner as that in Example 1 except that polyester A, polyester B, polyester C, polyester E and polyester F were mixed by 5:5:60:20:10 in mass ratio, and the temperature of the heating furnace after the lengthwise drawing was set to 105° C. The Tg of the undrawn film was 67° C. The evaluation results are shown in Table 3.

Example 4

A film with a thickness of 20 μm was produced in the same manner as in Example 3 except that polyester A, polyester B, polyester C and polyester F were mixed by 5:5:80:10 in mass ratio and that the relaxation was not performed in the intermediate heat treatment process but 28.6% relaxation was performed in the final heat treatment zone. The Tg of the undrawn film was 67° C. The evaluation results are shown in Table 3.

Example 5

A film with a thickness of 20 μm was produced in the same manner as in Example 4 except that polyester B, polyester C and polyester F were mixed by 5:90:5 in mass ratio, the thickness of the undrawn film was set to 160 μm, the relaxation ratio after lengthwise drawing was set to 40%, the intermediate heat treatment temperature was set to 118° C., and 33.3% relaxation was performed in the final heat treatment zone. The Tg of the undrawn film was 71° C. The evaluation results are shown in Table 3.

Example 6

A film having a thickness of 20 m was produced by the same process as in Example 5 except that the thickness of the undrawn film was set to 192 μm and the transverse drawing ratio was set to 6 times. The evaluation results are shown in Table 3.

Example 7

A film with a thickness of 20 μm was produced in the same manner as in Example 3 except that polyester A, polyester B, polyester C and polyester F were mixed by 5:25:60:10 in mass ratio. The Tg of the undrawn film was 67° C. The evaluation results are shown in Table 3.

Example 8

A film with a thickness of 20 μm was produced in the same manner as in Example 1 except that polyester A, polyester B, polyester C and polyester E were mixed by 5:5:60:30 in mass ratio, the thickness of the undrawn film was set to 315 μm, the temperature was set to 80° C. and the ratio was set to 4.5 times at the time of lengthwise drawing, the temperature of the heating furnace after the lengthwise drawing was set to 100° C., the relaxation ratio was set to 15%, the conditions of the intermediate heat treatment process were set to a temperature of 120° C., a relaxation of 24.7%, and a time of 10 seconds, the transverse drawing ratio was set to 7 times, and the relaxation ratio in the final heat treatment process was set to 21.9%. The Tg of the undrawn film was 75° C. The evaluation results are shown in Table 3.

Example 9

A film having a thickness of 20 μm was produced by the same process as in Example 1 except that the temperature of the heating furnace after the lengthwise drawing was changed from 95° C. to 50° C., the relaxation ratio in the length wise direction in the heating furnace was changed from 30% to 0% (that is, the relaxation was not performed), the relaxation ratio in the intermediate heat treatment process was changed from 28.6% to 30%, and the relaxation ratio in the final heat treatment process was changed from 0% to 28.6%. The evaluation results are shown in Table 3.

Comparative Example 1

A film with a thickness of 20 μm was produced in the same manner as in Example 1 except that the thickness of the undrawn film was set to 100 μm, the lengthwise drawing and the relaxation in the lengthwise direction were not performed, the temperature of the intermediate heat treatment zone was set to 100° C., the temperature at the time of the transverse drawing was set to 70° C., and the temperature of the final heat treatment was set to 80° C. The evaluation results are shown in Table 3. The film had a small stress ratio, and a large difference between the maximum shrinkage stress and a shrinkage stress after 30 seconds (see FIG. 3).

Comparative Example 2

A film having a thickness of 20 μm was produced by the same process as in Example 1 except that the thickness of the undrawn film was set to 224 μm, the relaxation ratio in the longitudinal direction in the heating furnace after the lengthwise drawing was set to 20%, the relaxation was not performed in the intermediate heat treatment process, the temperature of the intermediate heat treatment zone was set to 140° C., the transverse drawing ratio was set to 4 times, and the relaxation ratio in the final heat treatment zone was set to 12.5%. The evaluation results are shown in Table 3.

Comparative Example 3

A film with a thickness of 20 μm was produced in the same manner as in Example 3 except that polyester A, polyester B and polyester C were mixed by 5:25:70 in mass ratio, the thickness of the undrawn film was set to 260 μm, the temperature of the intermediate heat treatment zone was set to 145° C. and the relaxation was not performed in the intermediate heat treatment process, the temperature at the transverse drawing was set to 100° C., the temperature of the final heat treatment was set to 101° C., and the relaxation ratio in the final heat treatment process was set to 7.1%. The Tg of the undrawn film was 75° C. The evaluation results are shown in Table 3.

Comparative Example 4

A film having a thickness of 20 μm was produced by the same process as in Example 7 except that the thickness of the undrawn film was set to 100 μm, the relaxation ratio in the heating furnace after the lengthwise drawing was changed from 30% to 0%, the relaxation ratio in the intermediate heat treatment process was changed from 28.6% to 0%. The evaluation results are shown in Table 3.

TABLE 3

Evaluation results of characteristics of films and labels

| | Thickness (μm) | Hot-water shrinkage (%) 98° C. Longitudinal direction | Hot-water shrinkage (%) 98° C. Width direction | Difference in Specific Heat Capacity near Tg (J/(g · ° C.)) | Shrinkage stress in the width direction (MPa) Maximum stress | Shrinkage stress in the width direction (MPa) After 30 sec stress | Stress ratio (%) |
|---|---|---|---|---|---|---|---|
| Example 1 | 20 | 3 | 70 | 0.31 | 7.3 | 7 | 96 |
| Example 2 | 20 | 0 | 72 | 0.36 | 4.3 | 4 | 96 |
| Example 3 | 20 | 0 | 75 | 0.41 | 5.5 | 5.3 | 96 |
| Example 4 | 20 | 4 | 69 | 0.25 | 7.7 | 7.4 | 96 |
| Example 5 | 20 | −4 | 77 | 0.46 | 5.8 | 5.4 | 93 |
| Example 6 | 20 | −1 | 81 | 0.50 | 10.2 | 10 | 98 |
| Example 7 | 20 | 8 | 65 | 0.11 | 13.5 | 13 | 97 |
| Example 8 | 20 | 0 | 83 | 0.53 | 9.9 | 9.7 | 98 |
| Example 9 | 20 | 4 | 66 | 0.26 | 7.5 | 7.2 | 96 |
| Comparative Example 1 | 20 | 1 | 72 | 0.48 | 7.7 | 4 | 52 |
| Comparative Example 2 | 20 | 8 | 54 | 0.09 | 10 | 9.8 | 98 |
| Comparative Example 3 | 20 | 13 | 61 | 0.06 | 18.2 | 18 | 99 |
| Comparative Example 4 | 20 | 25 | 54 | 0.09 | 17.5 | 17 | 97 |

Evaluation results of characteristics of films and labels

| | Right-angled tearing strength (N/mm) | Tensile breaking strength (MPa) Longitudinal direction | Shrinkage strain of label | Insufficient Shrinking of Label | Wrinkels of label | Height of label | Perforation opening defective ratio (%) |
|---|---|---|---|---|---|---|---|
| Example 1 | 290 | 145 | Excellent | Excellent | Excellent | Excellent | 14 |
| Example 2 | 290 | 140 | Excellent | Excellent | Excellent | Excellent | 14 |
| Example 3 | 290 | 140 | Excellent | Excellent | Excellent | Excellent | 14 |
| Example 4 | 280 | 145 | Excellent | Excellent | Excellent | Excellent | 14 |
| Example 5 | 330 | 110 | Excellent | Excellent | Excellent | Excellent | 18 |
| Example 6 | 350 | 110 | Excellent | Excellent | Excellent | Excellent | 20 |
| Example 7 | 280 | 130 | Good | Good | Excellent | Good | 18 |
| Example 8 | 340 | 115 | Excellent | Excellent | Excellent | Excellent | 18 |
| Example 9 | 280 | 148 | Excellent | Excellent | Excellent | Excellent | 14 |
| Comparative Example 1 | 430 | 60 | Poor | Excellent | Poor | Excellent | 44 |
| Comparative Example 2 | 250 | 170 | Excellent | Poor | Excellent | Good | 10 |
| Comparative Example 3 | 260 | 150 | Poor | Poor | Excellent | Poor | 12 |
| Comparative Example 4 | 205 | 197 | Poor | Poor | Poor | Poor | 6 |

INDUSTRIAL APPLICABILITY

The heat-shrinkable polyester film of the present invention has high heat shrinkage and excellent properties as describe above, thus it can be used suitably as a label application for bottles. A package like a bottle obtained by using the heat-shrinkable polyester film of the present invention as a label shows a good appearance.

The invention claimed is:
1. A heat shrinkable polyester film which satisfies the following requirements (1) to (4):
 (1) the film has a hot-water heat shrinkage of not less than 55% and not more than 90% in a main shrinking direction of the film when dipped in hot water at 98° C. for 10 seconds;
 (2) the film has a hot-water heat shrinkage of not less than −5% and not more than 12% in a direction orthogonal to the main shrinking direction of the film when dipped in hot water at 98° C. for 10 seconds;
 (3) the film has a difference in specific heat capacity $\Delta C_p$ between at a lower and a higher temperature than Tg of not less than 0.1 J/(g·° C.) and not more than 0.7 J/(g·° C.) when a reverse heat flow is measured with a temperature modulated DSC; and

(4) the film has a tensile breaking strength of not less than 70 MPa and not more than 150 MPa in the direction orthogonal to the main shrinking direction of the film.

2. A package formed by covering at least a part of an outer periphery of an object to be packaged with a label obtained from the heat-shrinkable polyester film according to claim 1 and then shrinking the label on the covered object by heat.

3. The heat-shrinkable polyester film according to claim 1, wherein the film has a maximum shrinkage stress of not less than 2 MPa and not more than 14 MPa in the main shrinking direction of the film measured with hot air at 90° C., and a shrinkage stress of not less than 60% and not more than 100% of the maximum shrinkage stress 30 seconds after measurement start.

4. A package formed by covering at least a part of an outer periphery of an object to be packaged with a label obtained from the heat-shrinkable polyester film according to claim 3 and then shrinking the label on the covered object by heat.

5. The heat-shrinkable polyester film according to claim 3, wherein the film has a right-angled tearing strength per unit thickness of not less than 180 N/mm and not more than 350 N/mm in the direction orthogonal to the main shrinking direction of the film after being shrunk by 10% in the main shrinking direction in hot water at 80° C.

6. A package formed by covering at least a part of an outer periphery of an object to be packaged with a label obtained from the heat-shrinkable polyester film according to claim 5 and then shrinking the label on the covered object by heat.

7. The heat-shrinkable polyester film according to claim 5, which is biaxially drawn in the main shrinking direction and in the direction orthogonal to the main shrinking direction.

8. A package formed by covering at least a part of an outer periphery of an object to be packaged with a label obtained from the heat-shrinkable polyester film according to claim 7 and then shrinking the label on the covered object by heat.

9. The heat-shrinkable polyester film according to claim 3, which is biaxially drawn in the main shrinking direction and in the direction orthogonal to the main shrinking direction.

10. A package formed by covering at least a part of an outer periphery of an object to be packaged with a label obtained from the heat-shrinkable polyester film according to claim 9 and then shrinking the label on the covered object by heat.

11. The heat-shrinkable polyester film according to claim 1, wherein the film has a right-angled tearing strength per unit thickness of not less than 180 N/mm and not more than 350 N/mm in the direction orthogonal to the main shrinking direction of the film after being shrunk by 10% in the main shrinking direction in hot water at 80° C.

12. A package formed by covering at least a part of an outer periphery of an object to be packaged with a label obtained from the heat-shrinkable polyester film according to claim 11 and then shrinking the label on the covered object by heat.

13. The heat-shrinkable polyester film according to claim 11, which is biaxially drawn in the main shrinking direction and in the direction orthogonal to the main shrinking direction.

14. A package formed by covering at least a part of an outer periphery of an object to be packaged with a label obtained from the heat-shrinkable polyester film according to claim 13 and then shrinking the label on the covered object by heat.

15. The heat-shrinkable polyester film according to claim 1, which is biaxially drawn in the main shrinking direction and in the direction orthogonal to the main shrinking direction.

16. A package formed by covering at least a part of an outer periphery of an object to be packaged with a label obtained from the heat-shrinkable polyester film according to claim 15 and then shrinking the label on the covered object by heat.

* * * * *